(12) United States Patent
Shigetomi et al.

(10) Patent No.: US 10,202,202 B2
(45) Date of Patent: Feb. 12, 2019

(54) METHOD FOR REPAIRING LIGHTNING PROTECTION MATERIAL, AND MEMBER PROVIDED WITH LIGHTNING PROTECTION MATERIAL

(71) Applicant: MITSUBISHI AIRCRAFT CORPORATION, Aichi (JP)

(72) Inventors: Toshikazu Shigetomi, Tokyo (JP);
Masayoshi Suhara, Tokyo (JP);
Morimasa Ishida, Aichi (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 443 days.

(21) Appl. No.: 14/876,137

(22) Filed: Oct. 6, 2015

(65) Prior Publication Data
US 2016/0137310 A1 May 19, 2016

(30) Foreign Application Priority Data
Nov. 18, 2014 (JP) .................... 2014-233550

(51) Int. Cl.
*B64D 45/02* (2006.01)

(52) U.S. Cl.
CPC .................... *B64D 45/02* (2013.01)

(58) Field of Classification Search
CPC ................. B64D 45/02; B64C 1/12
See application file for complete search history.

(56) References Cited

U.S. PATENT DOCUMENTS

| | | | |
|---|---|---|---|
| 7,934,676 B2 * | 5/2011 | Dufresne | B64D 45/02 244/1 A |
| 8,246,770 B2 | 8/2012 | Ackerman et al. | |
| 2014/0290832 A1 | 10/2014 | Arikawa et al. | |
| 2015/0361308 A1 * | 12/2015 | Rezai | C09J 5/06 442/1 |

FOREIGN PATENT DOCUMENTS

| | | |
|---|---|---|
| JP | 2010-084848 A | 4/2010 |
| JP | 2014-188997 A | 10/2014 |

OTHER PUBLICATIONS

Japanese Office Action for Application No. 2014-233550, dated Sep. 4, 2018.

* cited by examiner

*Primary Examiner* — Brian M O'Hara
(74) *Attorney, Agent, or Firm* — Pearne & Gordon LLP

(57) ABSTRACT

The present invention provides a method for repairing a lightning protection material that is made of a metal material and is provided along a surface of a member formed by using a fiber reinforced resin includes: bonding a repair material made of a metal material over a lost region of the member where the lightning protection material is lost by using a liquid adhesive and a sheet-shaped holder that contains and holds the adhesive and is arranged at the lost region.

9 Claims, 3 Drawing Sheets

METHOD FOR REPAIRING LIGHTNING PROTECTION MATERIAL, AND MEMBER PROVIDED WITH LIGHTNING PROTECTION MATERIAL

BACKGROUND OF THE INVENTION

Field of the Invention

The present invention relates to repair of a lightning protection material that is provided on a member of an aircraft or the like.

Description of the Related Art

A metal member (referred to as a lightning protection material below) that disperses a lightning current is provided along a surface of an airframe of aircraft that is formed from a carbon fiber reinforced resin (a composite material) in order to impart lightning protection properties.

When the airframe is damaged, it is necessary to perform repair for restoring the airframe including the lightning protection material to an original state.

In the repair, a new lightning protection material is bonded to the airframe in a region where the lightning protection material is lost by a film adhesive (e.g., U.S. Pat. No. 8,246,770).

The film adhesive is formed from a thermosetting resin, and is handled at a low temperature before used. When used, the film adhesive is heated to a predetermined temperature and is thereby cured.

It is convenient to use the film adhesive formed into a uniform thickness for bonding the lightning protection material to the airframe with a stable quality.

Here, the adhesive used for bonding the lightning protection material to the airframe is required to retain a high bonding force over a long period. A curing temperature of the film adhesive that meets the requirement exceeds 100° C. Therefore, when the adhesive is cured, the airframe is also heated to a temperature similar to that of the adhesive.

When the fiber reinforced resin having hygroscopicity is heated to 100° C. or more, moisture accumulated within a structural member (for example, a skin) of the airframe is rapidly evaporated in a large amount, and an internal pressure of the structural member excessively increases. The structural member may be thereby damaged with, for example, a plurality of layers constituting the structural member being separated. In this case, it is necessary to repair the damage secondarily caused by the repair.

An object of the present invention is to repair a lightning protection material provided on a member made of a fiber reinforced resin with a stable bonding quality while avoiding damage caused by moisture existing within the member.

SUMMARY OF THE INVENTION

The present invention is a method for repairing a lightning protection material that is made of a metal material and is provided along a surface of a member formed by using a fiber reinforced resin, the method including: bonding a repair material made of a metal material over a lost region of the member where the lightning protection material is lost by using a liquid adhesive and a sheet-shaped holder that contains and holds the adhesive and is arranged at the lost region.

In accordance with the present invention, since the liquid adhesive is kept at a uniform thickness along the holder at a position of the sheet-shaped holder, it is possible to repair the lightning protection material with a stable bonding quality by using the liquid adhesive that is highly fluid. That is, a problem of the bonding quality occurring when the liquid adhesive is used is solved. Thus, a temperature rise of the member at the time of curing the adhesive can be suppressed by using the liquid adhesive generally having a lower curing temperature than that of a film adhesive. Since the temperature rise is suppressed, an increase in an internal pressure of the member due to evaporation of moisture existing within the member is reduced. It is thus possible to avoid damage to the member due to an excessive internal pressure.

As the holder in the present invention, a holder that is formed into a sheet shape from fibers, and contains and holds the adhesive among the fibers may be used.

Examples of the holder formed into a sheet shape from fibers include a fabric woven from fibers, and a nonwoven fabric formed such that fibers are entangled.

An inorganic material, particularly, a glass material are preferably used for the fibers of the holder in the present invention.

The holder is left as it is on a back side of the repair material after repairing the lightning protection material.

When the holder made of the glass material having high insulation properties is arranged on the back side of the repair material, a lightning current dispersed by the lightning protection material can be prevented from flowing to the back side of the repair material by the holder. That is, lightning protection properties are improved.

In the present invention, the repair material is preferably overlapped with the lightning protection material existing around the lost region to be brought into contact and electrical continuity with the lightning protection material.

In a portion where the repair material and the lightning protection material are overlapped, the repair material and the lightning protection material can be surely brought into contact and electrical continuity with each other with a sufficient contact area. A lightning current can be thereby sufficiently dispersed over the repair material and the lightning protection material.

A thermosetting resin may be used, or a photosetting resin may be used for the adhesive in the present invention.

A curing temperature of the adhesive made of the thermosetting resin is preferably less than 100° C. that is a boiling point of water. The curing temperature is more preferably 50° C. or more and 80° C. or less.

A member according to the present invention is a member formed by using a fiber reinforced resin, the member including: a lightning protection material that is provided along a surface of the member; a repair material that is made of a metal material and is arranged at a lost region where the lightning protection material is lost; an adhesive that bonds the repair material to the member; and a sheet-shaped holder that contains and holds the adhesive and is arranged at the lost region.

When a glass material is used for the holder, lightning protection properties can be improved.

The method for repairing a lightning protection material, and the member provided with a lightning protection material described above are suitable for repairing a member constituting an aircraft.

In accordance with the present invention, it is possible to repair the lightning protection material provided on the member made of the fiber reinforced resin with a stable bonding quality while avoiding the damage caused by the moisture existing within the member.

BRIEF DESCRIPTION OF THE DRAWINGS

FIGS. 1A-1E are schematic views in which FIG. 1A shows an initial state of a lightning protection material according to an embodiment of the present invention, FIG. 1B shows a damaged state, and FIGS. 1C to 1E show a repair process;

DETAILED DESCRIPTION OF THE PREFERRED EMBODIMENTS

In the following, an embodiment of the present invention will be described by reference to the accompanying drawings.

In the present embodiment, repair of a lightning protection material that is provided on a skin constituting an airframe of an aircraft is described.

Figure 1A:
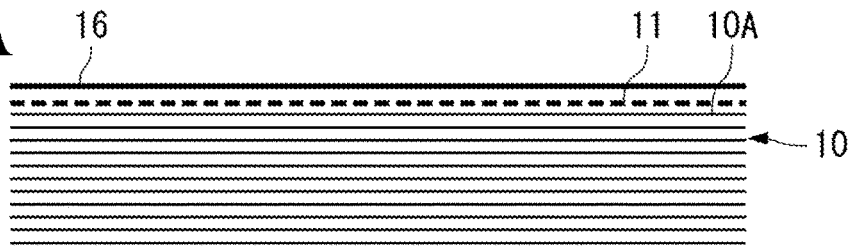

A skin 10 shown in FIG. 1A is formed from a carbon fiber reinforced resin (CFRP; carbon fiber reinforced plastic) containing carbon fibers as reinforcing fibers. The skin 10 is formed by an appropriate number of layers for a required thickness. Each of the layers has a fiber substrate formed from carbon fibers, and a resin impregnated into the fiber substrate.

In order to impart lightning protection properties to the skin 10 formed from the CFRP having lower conductivity than that of a metal material such as aluminum alloy, a lightning protection material 11 that is formed from a metal material is bonded to a surface 10A of the skin 10.

The lightning protection material 11 disperses a current of lightning striking the skin 10 along the surface 10A of the skin 10. The lightning protection material 11 thereby prevents the skin 10 from being damaged by the current concentrating in a portion of the skin 10. By dispersing the current over the lightning protection material 11, concentration of the current in a metal fastener that is arranged in the skin 10 is also avoided. The lightning protection material 11 thereby prevents a spark from being generated inside the skin 10 by the current flowing through the fastener.

The lightning protection material 11 is a metal mesh or a metal foil that is formed from a material having high conductivity, such as copper alloy. The metal mesh is formed in a mesh shape by punching a metal sheet (including a metal foil), slitting and stretching a metal sheet, or forming metal wires in a grid pattern.

The lightning protection material 11 is bonded to the skin 10 by using a film adhesive (not shown).

The film adhesive is obtained by forming an adhesive containing a thermosetting resin into a film shape. A curing reaction of the resin is restricted by handling the film adhesive at a low temperature until the adhesive is used. The film adhesive is cured when heated to, for example, about 120 to 180° C.

A coating film 16 is applied to a surface of the lightning protection material 11. The coating film 16 may include a primer layer and a topcoat layer in addition to a layer mainly including a coating material or paint.

When the lightning protection material 11 is damaged by colliding with a bird, or hitting something during maintenance, or is locally melted to be damaged with a lightning current flowing therethrough, it is necessary to repair the lightning protection material 11 by removing a damaged portion of the lightning protection material 11, and replacing the damaged portion with a repair material 12 (FIG. 1D) having a configuration similar to the lightning protection material 11 in order to ensure safety of the aircraft.

Figure 1B:
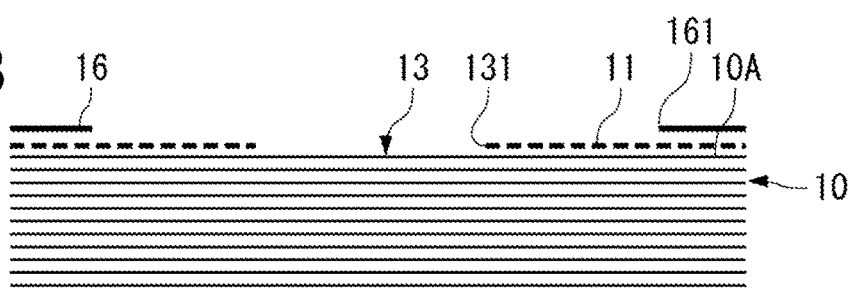
Figure 2:
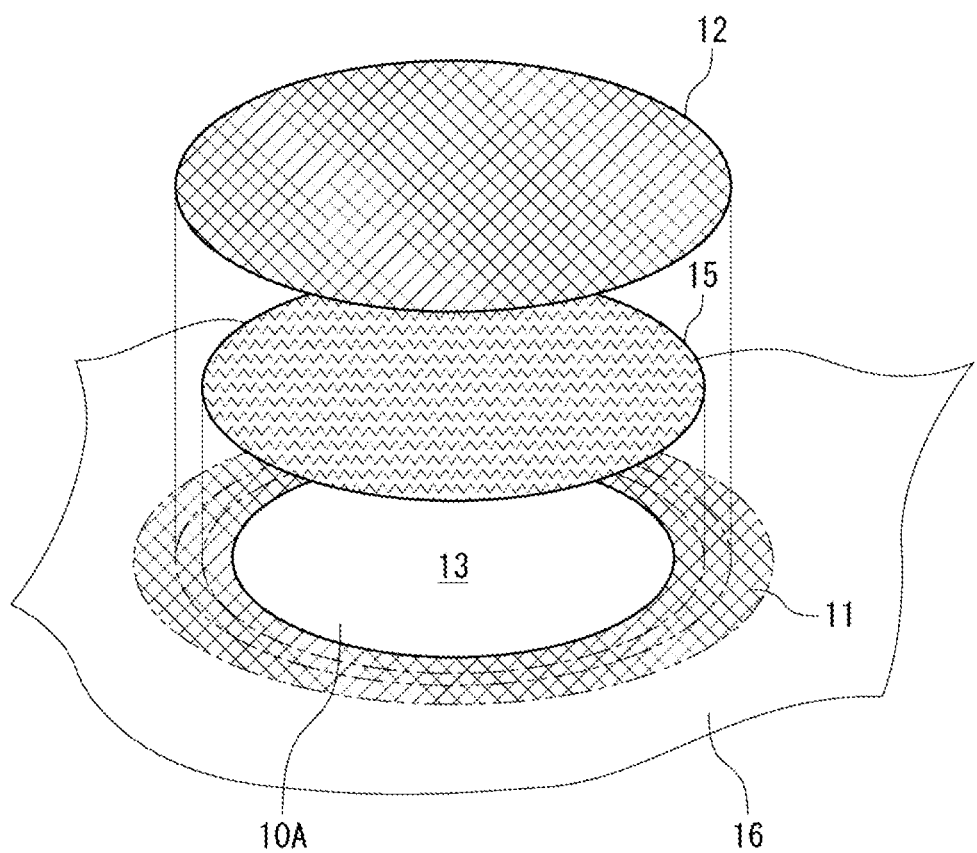
FIG. 2 is a perspective view illustrating a repair material and a holder used for repairing the lightning protection material.

FIG. 1B and FIG. 2 show a region 13 of the skin 10 where the lightning protection material 11 is lost due to the damage. It is preferable to remove the coating film 16 and the lightning protection material 11 in the lost region 13 by sanding or the like even when the coating film 16 or the lightning protection material 11 is partially left in the lost region 13, and thereby prepare the lost region 13 where the surface 10A of the skin 10 is entirely exposed. Accordingly, the repair material 12 is easily bonded uniformly to the surface 10A.

An optional region of the coating film 16 is also lost by an impact that causes the damage to the lightning protection material 11 or by treatment of the lost region 13 (FIG. 1B).

Here, the coating film 16 is lost in a wider range than the lost region 13, and the lightning protection material 11 is exposed between an outer peripheral edge 131 of the lost region 13 and an inner peripheral edge 161 of the coating film 16.

In a case in which not only the lightning protection material 11 but also the skin 10 is damaged, a repair patch (not shown) is arranged at a damaged portion of the skin 10, and the repair material 12 is arranged at the lost region 13 including a surface of the repair patch, and is bonded to the lost region 13.

The repair material 12 (FIG. 2) arranged over the lost region 13 is preferably formed in a similar form (a metal mesh, a metal foil or the like) from a similar metal material to those of the lightning protection material 11. However, it is also allowed that the metal material and the form used for the repair material 12 and the metal material and the form used for the lightning protection material 11 are different.

The repair material 12 is formed in the same shape as a shape (a circular shape in the present embodiment) of the lost region 13. An outer diameter of the repair material 12 indicated by an alternate long and two short dashes line in FIG. 2 is larger than an inner diameter of the lost region 13.

The repair material 12 is bonded over the entire lost region 13 by using a liquid adhesive 14 (FIG. 1C), and curing the adhesive 14 by heating.

The liquid adhesive 14 can be formed by using a thermosetting resin such as epoxy, polyimide, polyurethane, and unsaturated polyester resins.

The adhesive 14 is not limited to an adhesive made of one component, and a two-part adhesive that is in a curable state by mixing two components may be employed.

A temperature necessary for curing the adhesive 14 (a curing temperature) does not exceed 100° C., and is, for example, about 50 to 80° C.

A reason why the liquid adhesive 14 having a lower curing temperature than that of the film adhesive used for bonding the lightning protection material 11 is used is related to hygroscopicity of the skin 10. Moisture at a molecular level is contained within the skin 10. Especially after cruising of the aircraft, moisture is accumulated within the skin 10. Thus, when the skin 10 is heated to a high temperature at the time of curing the adhesive 14, evaporation of the moisture is promoted, and an internal pressure of the skin 10 is increased. When the internal pressure becomes excessive, the skin 10 may be damaged.

That is, by using the adhesive 14 having a low curing temperature, a temperature rise of the skin 10 at the time of curing the adhesive 14 can be suppressed, and the internal pressure of the skin 10 can be prevented from becoming excessive due to the moisture evaporation.

Here, in order to bond the repair material 12 to the lost region 13 with a stable quality by using the liquid adhesive 14 that is highly fluid due to low viscosity, a holder 15 (FIG.

1C, FIG. 2) that contains and holds the adhesive 14 is arranged at the lost region 13.

The holder 15 is a fabric woven from glass fibers. By containing the adhesive 14 among the glass fibers, the holder 15 keeps the adhesive 14 in the fabric. Flow out of the adhesive 14 is thereby restricted.

The holder 15 is preferably arranged over the entire lost region 13. An outer diameter (indicated by an alternate long and short dash line in FIG. 2) of the holder 15 of the present embodiment is larger than the inner diameter of the lost region 13.

The holder 15 is not limited to the fiber fabric, and may be a nonwoven fabric, a sponge, or the like. A porous material having pores in which the adhesive 14 can be contained may be also used as the holder 15.

In the following, steps of bonding the repair material 12 to the lost region 13 on the skin 10 by using the liquid adhesive 14 and the holder 15 will be described.

Figure 1C:
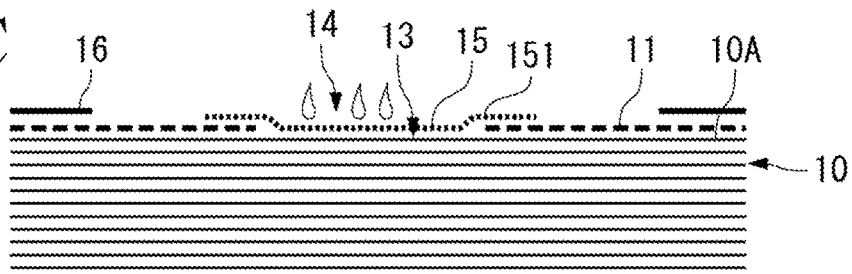

First, the holder 15 is impregnated with the adhesive 14, and the holder 15 is arranged at the lost region 13 on the skin 10 as shown in FIG. 1C. At this time, it is preferable to arrange the holder 15 concentrically with the lost region 13, and overlap a peripheral portion 151 of the holder 15 with the lightning protection material 11 existing around the lost region 13.

Instead of arranging the holder 15 impregnated with the adhesive 14 at the lost region 13 as described above, the adhesive 14 may be poured into the holder 15 arranged at the lost region 13, and thereby spread over the entire holder 15.

Figure 1D:
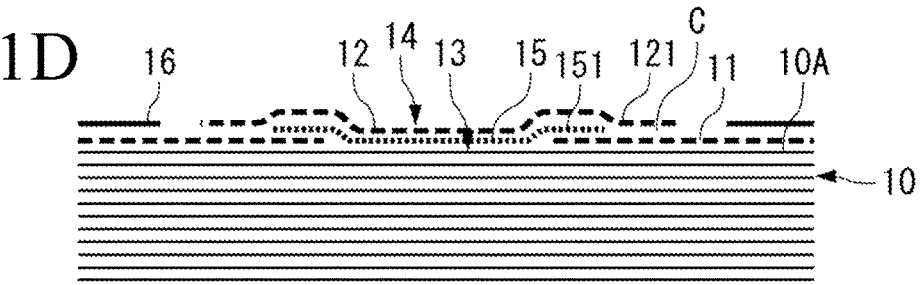

Subsequently, as shown in FIG. 1D, the repair material 12 is arranged on the holder 15 containing the adhesive 14 among the fibers. At this time, it is preferable to arrange the repair material 12 concentrically with the holder 15, and overlap the repair material 12 with the lightning protection material 11 (a portion indicated by reference character C in FIG. 1D) outside the peripheral portion 151 of the holder 15.

Subsequently, the adhesive 14 is heated to a temperature necessary for curing via the repair material 12 by a heat source (not shown) and is thereby cured. For example, a heater mat is arranged on a surface of the repair material 12, and the adhesive 14 is uniformly heated by heat emitted from the heater mat. Alternatively, the adhesive 14 may be heated by using a heat source such as a heat gun.

By setting an output of the heat source to a level just enough to sufficiently cure the adhesive 14, the temperature rise of the skin 10 due to the heat transferred from the heat source through the repair material 12 and the adhesive 14 is suppressed as compared to a case in which the film adhesive is cured. Even if the temperature of the skin 10 rises to the same temperature as that of the adhesive 14, the temperature does not exceed 100° C. Therefore, the moisture existing within the skin 10 is not rapidly evaporated in a large amount, and the internal pressure of the skin 10 can be prevented from becoming excessive, so that the skin 10 is not damaged.

In order to prevent formation of bubbles between the repair material 12 and the surface 10A of the skin 10 or the lightning protection material 11, a bag film (not shown) may be used to cover the repair material 12 and draw a vacuum throughout a period before the adhesive 14 is heated and cured and while the adhesive is being heated and cured.

The adhesive 14 held among the fibers of the holder 15 does not flow out of the lost region 13 in an unrestricted manner, but is spread so as to only blur an outer side of the lost region 13. The adhesive 14 also permeates the entire thickness of the holder 15.

Thus, a sufficient amount of the adhesive 14 for surely bonding the repair material 12 to the lost region 13 is ensured. Also, a sufficient amount of the adhesive 14 for bonding the peripheral portion 151 of the holder 15 and a peripheral portion 121 of the repair material 12 outside the peripheral portion 151 to the lightning protection material 11 is supplied to the peripheral portion 151 and the peripheral portion 121. The adhesive 14 is also supplied between the peripheral portion 151 of the holder 15 and the repair material 12.

Therefore, when the adhesive 14 is cured, the repair material 12 is surely bonded to the lost region 13 and the lightning protection material 11 around the lost region 13, and the holder 15 is also surely bonded to the lost region 13, the lightning protection material 11 around the lost region 13, and the repair material 12 on a back side of the repair material 12.

Moreover, since the adhesive 14 is kept at a uniform thickness along the sheet-shaped holder 15 and is cured, a bonding quality including a bonding strength is stabilized.

Since the repair material 12 and the lightning protection material 11 around the repair material 12 are bonded together, the repair material 12 and the lightning protection material 11 are surely brought into contact and electrical continuity with each other. Accordingly, the repair material 12 and the lightning protection material 11 integrally exert a function of dispersing a lightning current, and can thereby recover the lightning protection properties of the airframe.

In the C portion (FIG. 1D) where the repair material 12 and the lightning protection material 11 are overlapped, the repair material 12 and the lightning protection material 11 can be more surely brought into contact and electrical continuity with each other with a sufficient contact area.

Note that the bonded repair material 12 and the lightning protection material 11 around the repair material 12 form a continuous smooth surface.

Figure 1E:
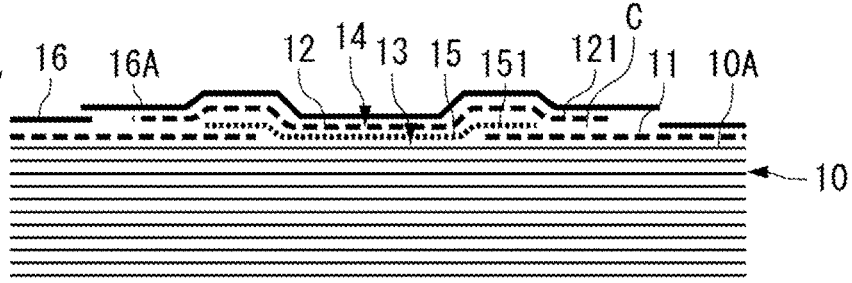

Finally, as shown in FIG. 1E, a coating film 16A continuous to the remaining coating film 16 is applied to a region where the coating film 16 is lost.

The repair of the lightning protection material 11 is completed through the steps as described above.

Even when the adhesive 14 having no conductivity is interposed between the repair material 12 and the lightning protection material 11, the adhesive 14 gathers in an outer peripheral portion by flowing during the vacuum drawing or the like, so that electrical continuity between the repair material 12 and the lightning protection material 11 is partially ensured, and a lightning current sufficiently flows between the repair material 12 and the lightning protection material 11. Thus, the adhesive 14 does not practically affect electrical continuity properties between the repair material 12 and the lightning protection material 11. As long as the lightning current sufficiently flows to be dispersed through the electrical continuity position between the repair material 12 and the lightning protection material 11, it is considered that the repair material 12 and the lightning protection material 11 are in "contact and electrical continuity" with each other, including a case in which the adhesive 14 is interposed between the repair material 12 and the lightning protection material 11.

According to the present embodiment, the adhesive 14 is kept at a uniform thickness along the holder 15 at the position of the holder 15, so that the repair can be performed with a stable bonding quality by using the liquid adhesive 14. Since the liquid adhesive generally having a lower curing temperature than that of the film adhesive can be employed, it is possible to suppress the temperature rise of the skin 10 at the time of curing the adhesive, and avoid the secondary damage caused by heating during bonding.

As shown in FIG. 1E, the holder 15 is left as it is in the skin 10 where the lightning protection material 11 is repaired. Glass that is an inorganic material is used for the holder 15 of the present embodiment.

Therefore, the holder 15 has much lower conductivity and higher insulation properties than those of the lightning protection material 11 formed from the metal material, and even those of the skin 10 formed from the CFRP.

When the holder 15 having high insulation properties is arranged on the back side of the repair material 12, the lightning current dispersed over the repair material 12 and the lightning protection material 11 can be prevented from flowing to the back side of the repair material 12 by the holder 15. That is, the lightning protection properties are improved.

Here, when the holder 15 extends to the outer peripheral edge 131 of the lost region 13, the adhesive 14 held in the peripheral portion 151 of the holder 15 is spread between the peripheral portion 121 of the repair material 12 and the lightning protection material 11. A gap between the peripheral portion 121 and the lightning protection material 11 can be thereby tightly sealed by the adhesive 14. It is thus possible to prevent a void that causes generation of a spark in a lightning strike from being formed between the peripheral portion 121 and the lightning protection material 11.

The following can be mentioned based on a form of the metal mesh that can be employed as the repair material 12.

First, examples of the metal mesh include one obtained by forming metal wires in a grid pattern by plain weave, twill weave, or the like (a metal fine wire mesh), one obtained by punching a plurality of holes in a metal sheet (punched metal), one obtained by slitting and stretching a metal sheet (expanded metal) and the like. In all of the examples, openings penetrating the repair material 12 in a thickness direction are arranged over the entire surface of the repair material 12. The adhesive 14 enters the openings, and the adhesive 14 reaches an opposite side to a bonded surface of the repair material 12 with the surface 10A of the skin 10 or the lightning protection material 11 through the openings, so that an anchoring effect is obtained. A bonding force can be thereby increased.

It is preferable to use the metal fine wire mesh for the repair material 12 from the following perspective regarding the lightning protection properties.

When the metal fine wire mesh is used, an intersection point between metal fine wires protrudes from its periphery. Thus, a plurality of small protrusions are formed in the repair material 12. In a lightning strike, a lightning current is dispersed over the protrusions, so that an impact of the lightning strike is also dispersed. Thus, damage to the repair material 12 can be reduced.

Moreover, the intersection points of the metal fine wire mesh pass through the adhesive 14 to come into direct contact with the lightning protection material 11 in the peripheral portion 121 of the repair material 12, so that the electrical continuity properties between the repair material 12 and the lightning protection material 11 are improved.

By the way, a liquid adhesive made of a photosetting resin may be also used as the liquid adhesive 14 held by the holder 15. For example, an ultraviolet-curing adhesive can be employed.

In this case, the metal mesh is employed as the repair material 12, and the photosetting adhesive 14 is irradiated with light through the openings of the metal mesh. When irradiated with light having a suitable wavelength, the photosetting adhesive is rapidly cured.

By using the photosetting adhesive 14, it becomes unnecessary to heat the adhesive when the repair material 12 is bonded.

Therefore, the secondary damage to a member caused by heating during bonding does not occur.

An arrangement aspect of the holder 15 and the repair material 12 is not limited to that in the above embodiment, and can be changed into various aspects.

Figure 3:
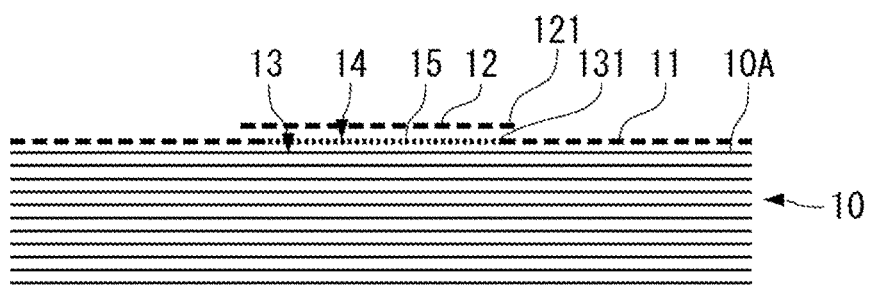
FIG. 3 is a view illustrating another embodiment of the present invention.

For example, in an example shown in FIG. 3, the holder 15 formed in the same size as that of the lost region 13 is arranged in the lost region 13, and the peripheral portion 121 of the repair material 12 is overlapped with the lightning protection material 11 at a position very close to the outer peripheral edge 131 of the lost region 13. In this case, it is also possible to bond the repair material 12 to the skin 10 with a stable quality by the effect of the holder 15, secure the effect of dispersing a lightning current by surely bringing the repair material 12 and the lightning protection material 11 into contact and electrical continuity with each other, and further improve the lightning protection properties by the insulation properties of the holder 15.

The constitutions described in the aforementioned embodiments may be also freely selected or appropriately changed into other constitutions without departing from the gist of the present invention.

From the perspective of keeping the adhesive in the holder, the holder in the present invention is not limited to the one using the insulating material. As long as the holder can contain and hold the adhesive, the holder can be formed from any material.

The present invention can be used for repairing general structures formed from a composite material, such as blades of a wind turbine.

What is claimed is:

1. A method for repairing a lightning protection material that is provided along a surface of a member formed by using a fiber reinforced resin, the lightning protection material being made of a metal material, the method comprising
bonding a repair material made of a metal material over a lost region of the member where the lightning protection material is lost, wherein the repair material is bonded by using a liquid adhesive and a sheet-shaped holder that contains and holds the adhesive and is arranged at the lost region,
wherein a thermosetting resin is used for the adhesive, and
wherein a curing temperature of the adhesive is 50° C. or more and 80° C. or less.

2. The method for repairing a lightning protection material according to claim 1,
wherein the holder is formed into a sheet shape from fibers, and contains and holds the adhesive among the fibers.

3. The method for repairing a lightning protection material according to claim 2,
wherein a glass material is used for the fibers of the holder.

4. The method for repairing a lightning protection material according to claim 1,
wherein the repair material is overlapped with the lightning protection material existing around the lost region to be brought into contact and electrical continuity with the lightning protection material.

5. The method for repairing a lightning protection material according to claim 1, wherein the holder is made of an insulating material, and is left as it is on a back side of the repair material after repairing the lightning protection material.

6. The method for repairing a lightning protection material according to claim 1,
wherein the member constitutes an aircraft.

7. A method for repairing a lightning protection metal material that is provided along a surface of a member formed by using a fiber reinforced resin, the lightning protection metal material being made of a metal material, the method comprising
bonding a repair material made of a metal material over a lost region of the member where the lightning protection metal material is lost by using a liquid adhesive and a sheet-shaped holder that contains and holds the adhesive and is arranged at the lost region,
wherein the repair material is overlapped with the lightning protection metal material existing around the lost region to be brought into contact and electrical continuity with the lightning protection metal material,
wherein the holder (15) is larger than the lost region (13) in a surface direction, and an outer periphery of the holder (15) is bonded to the lightning protection metal material outside the lost region (13), and
wherein the repair material (12) made of the metal material is larger than the holder (15) in a surface direction, and an outer periphery of the repair material (12) is overlapped with the lightning protection metal material outside the holder (15).

8. The method for repairing a lightning protection material according to claim 7,
wherein a photosetting resin is used for the adhesive.

9. The method for repairing a lightning protection material according to claim 8,
wherein the repair material is a metal mesh, and
the adhesive is cured by being irradiated with light through openings of the metal mesh.

* * * * *